Patented Sept. 2, 1941

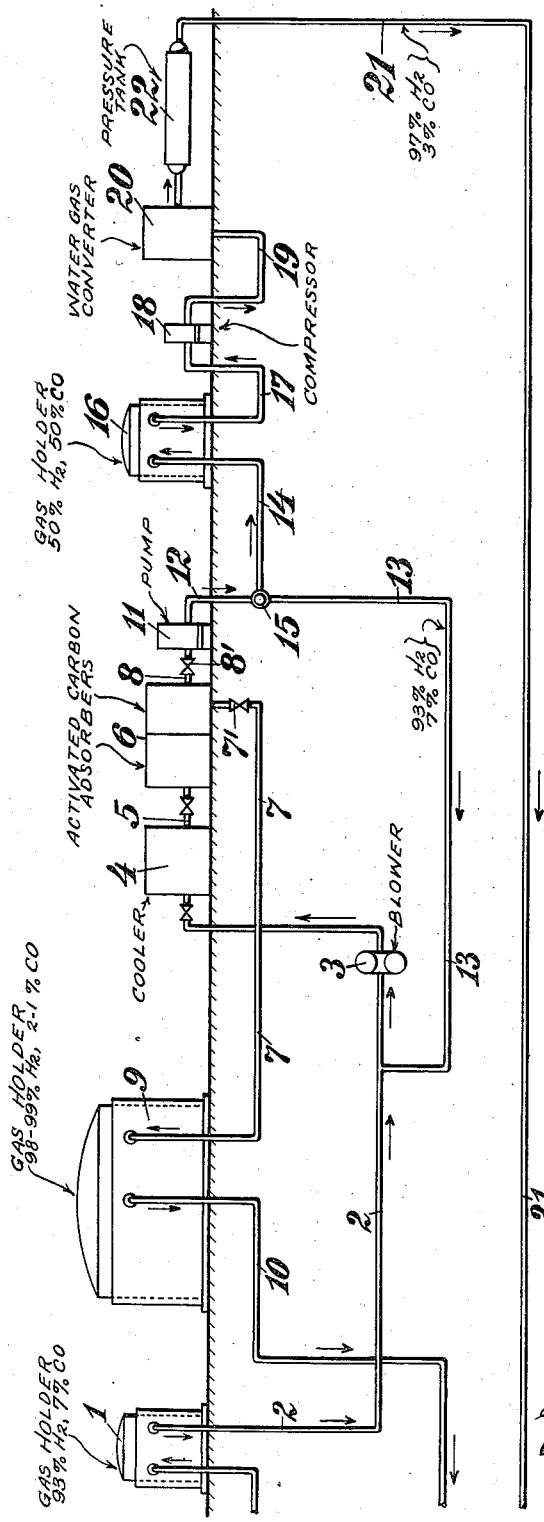

2,254,799

UNITED STATES PATENT OFFICE 2,254,799

PROCESS FOR THE REMOVAL OF CARBON MONOXIDE FROM MIXTURES THEREOF WITH HYDROGEN

Konrad Erdmann, Radenthein, Germany, assignor to American Magnesium Metals Corporation, Pittsburgh, Pa.

Application April 22, 1939, Serial No. 269,365
In Germany May 7, 1938

4 Claims. (Cl. 183—4)

This invention relates to a process for the removal of carbon monoxide from mixtures thereof with hydrogen.

For the removal of carbon monoxide from mixtures thereof with hydrogen the technical process principally employs the reaction of the carbon monoxide with steam, to form carbon dioxide and hydrogen (water gas oxidation). Another large scale technical process for the separation of such gaseous mixtures depends upon liquefaction by cooling to a low temperature. Various other processes such as preferential oxidation of carbon monoxide with oxygen, reduction to methane or methanol, adsorption with copper salt solutions or with caustic soda solutions are employed especially in order to remove by subsequent purification the residual quantities of carbon monoxide which remain behind after most of the carbon monoxide has been removed in the aforesaid large scale technical processes. The selective adsorption on solid substances of large surface which stands so very much in the foreground in other fields has hitherto not proved suitable for the separation of carbon monoxide and hydrogen. Perley does indeed state (see U. S. A. specification No. 1,896,916) that certain metal oxide gels are capable of selectively adsorbing the carbon monoxide and carbon dioxide from a water gas mixture so that on charging these adsorbents to saturation technically pure hydrogen passes through unbound. By driving out the adsorbate with the aid of a reduction of pressure which is preferably followed by an activation of the gels with hot air a mixture of carbon monoxide and carbon dioxide in the ratio of 8:1 is said to be recovered, which only contains traces of hydrogen, nitrogen and oxygen. Perley mentions as suitable adsorbents, the colloidal oxides of the metals titanium, zirconium, vanadium, columbium, thorium, molybdenum, chromium, manganese, iron, cobalt, nickel, copper, beryllium, magnesium and the rare earths. This process has not however been utilised commercially (see "Das Kohlenoxyd" Dr. Jurgen Schmidt, Leipzig, Akadem. Verlagsges., 1935, p. 73); even if it were capable of being carried out with the result indicated, the lack of technical success has apparently been due to the necessity of employing colloidal metal oxides, the life of which as adsorbents is further shortened by the intermediate heating. It is not possible to replace the metal oxide gels in this process by insensitive adsorbents of the type of active carbon because the adsorption constants of the two gases in relation to active carbon lie too near to one another at low working temperatures.

A process has been proposed for the separation of hydrogen and carbon monoxide with the aid of adsorption agents of the type of active carbon or of silica gel. In this process the mixture of the two gases is forced into the adsorption agents in the original proportion of the components and a separation or enrichment is only produced by fractional desorption with the aid of a reduction of pressure whereby the adsorption agent releases the gas mixture with reduction of pressure in such a way that in the first fractions the difficultly adsorbable hydrogen predominates, while in the last fractions the more readily adsorbable carbon monoxide predominates. In contradistinction to this, by the present invention the problem is solved of separating mixtures of hydrogen and carbon monoxide with the aid of active charcoal or adsorption charcoal, so-called A-carbon, the most customary and cheapest adsorbent, by selective adsorption, hence to attain the object that the carbon monoxide is preferentially retained on charging whilst a very considerable proportion of the gas mixture flows away unbound in this working stage as a fraction rich in hydrogen, whereupon one or more fractions, in which the carbon monoxide is enriched, are released by driving out the adsorbate with the aid of pressure reduction which the above process employs exclusively for the separation of the two gases.

The present process has the advantage that it does not require the use of high pressure-tight apparatus; that moreover 90–95% of the thermal energy expended can be recovered whereby moreover the cooling is from the outset cheaper than compression. Moreover, the process is also superior in its results to the known processes, especially as regards the enrichment of the hydrogen.

Accordingly, it is the main object of this invention to provide a process for the removal of carbon monoxide from gaseous mixtures containing it accompanied with hydrogen, with the aid of selective adsorption on active carbon.

Another object of the invention is to provide a process of this kind which requires only a small quantity of adsorption agent and ensures a gentle treatment of the same, both these circumstances contributing to the economy of the process.

It has been possible to obtain these objects in that the charging of the adsorption agents proceeding at low temperatures is broken off in each charging operation long before the adsorption equilibrium is attained. So long as the carbon is still fully adsorptive, the hydrogen passing through contains very small quantities of carbon monoxide, while with increasing saturation the curve of the carbon monoxide content increases steeply until the adsorption equilibrium is attained. The duration of the charging steps is therefore kept as short as possible. The adsorbate may be completely driven out in a few minutes by appropriate reduced pressure; even if only two adsorption chambers are provided, which are set in operation alternately, the charging and de-charging steps can be caused to alternate in a period of time of the order of minutes.

If the further measure is employed of undertaking the pressure reduction in two or more steps and thus collecting the desorbate set free separately, as is known per se, then also a fraction relatively poor in carbon monoxide may be separated as first running before the components rich in carbon monoxide have been driven out. This first running is advantageously led back into the starting mixture before the latter enters the adsorption chamber.

An embodiment of the invention will now be described by way of example:

A mixture of 93% of hydrogen with 7% of carbon monoxide cooled to —50° C. is led over an active charcoal which is pre-cooled to —50° C. Assuming that under the working conditions chosen (velocity of gas flow and the like), the adsorption equilibrium characteristic for this gas mixture is set up after 10 minutes, that is that after a charging time of 10 minutes the gas emerges with the same carbon monoxide content with which the starting mixture enters, then the mean value of the carbon monoxide content of the hydrogen freely passing through during an entire charging process would amount to about 4.8%. In the first minutes however a more considerable proportion of hydrogen with 1 to 2% of carbon monoxide escapes from the adsorption chamber. If the change from the conditions of charging to the condition of driving off is allowed to occur regularly at this point of time then the overwhelmingly preponderating quantity of hydrogen with 1 to 2% of carbon monoxide can be obtained in the adsorption phase as an unbound component. When decharging by suction when the pressure is gradually reduced to a reduced pressure of 100 mms. 50% by volume of a mixture is released, the carbon monoxide content of which is about equal to that of the starting mixture. Upon further reduction of the pressure to 10 mms. the carbon monoxide content in the desorbate increases steeply with reduction of pressure so that the mean value of the CO concentration in the remaining 50% by volume is nearly 10 times greater than the content in the starting mixture. By fractional desorption the desorbate can be decomposed into these two fractions, the first of which is advantageously led back into the starting mixture in the path of this mixture to the adsorption chamber. If the whole desorbate is collected together then its CO content amounts to about 38%.

The main portion of hydrogen with 1-2% of carbon monoxide passing through unbound may if desired be brought to a lower carbon monoxide content or entirely freed from carbon monoxide by treatment according to any known chemical or physical subsequent purification methods. The portion of the desorbate rich in carbon monoxide is freed, preferably by water gas oxidation, from carbon monoxide to the desired residual content, or carbon monoxide is extracted therefrom by liquefaction by cooling to a low temperature, or by treatment with copper salt solution. After cutting off the vacuum pump, the active carbon is ready for adsorbing the next charge without a special re-activation being necessary. It is sufficient from time to time, may be after 150 to 200 working days, to free the adsorbent by gentle heating (for example to 70° C.) from the admixtures retained which are solid at the working temperature and do not possess a sufficiently high vapor pressure in order to be removed by reduced pressure (for example water). Hence it is advantageous to work with three adsorption chambers, each of which is provided with devices for heating and cooling.

The circumstance, that as a result of the rapid alternation of the charging and de-charging periods the quantity of the adsorption agent can be so small that it only amounts to a fraction of the quantities generally employed, contributes to the economy of the process. Because of the small demand upon the active carbon, moreover, the life of the latter is almost unlimited.

A suitable apparatus for carrying out the process of the invention is shown diagrammatically in the drawing:

Referring to the drawing a conduit 2 leads from a gas holder 1 through a blower 3 to a cooler 4 which cools the gas to a low temperature and which is connected through conduit 5 to an adsorption chamber 6 which contains active charcoal. There are provided at least two adsorption chambers which are set in operation alternately, preferably however three, each of which is provided with devices for heating and cooling. Two conduits 7 and 8 branch off from each of the adsorption chambers 6 connected side by side. The conduit 7 leads to a gas holder 9, from which the gas collected is removed through the tube 10 whilst on the other hand the other conduit 8 leads to the suction side of a pump 11, to the pressure side of which a conduit 12 common to all the adsorption chambers is connected, which forks into the conduits 13 and 14. A two-way valve 15 is inserted at the forking place. The conduit 13 opens into the conduit 2 at a position in front of the blower 3 in the sense of the direction of flow. The conduit 14 leads to a gas holder 16, from which a compressor 18 sucks off the collected gas through the conduit 17 in order to send it through the conduit 19 into the converting plant 20. A pressure vessel 22 is connected into the lead-off 21 of the converting plant.

The plant works as follows: The starting mixture is sucked out of the gas holder 1 by the blower 3 and pressed into the cooler 4 in which it is cooled by way of example to —50° C. From here the mixture passes into an adsorption chamber 6, the charge of which is precooled to —50° C. During this process the valve 7' in the conduit 7 is open and the valve 8' in the conduit 8 is closed, so that the unbound mixture of carbon monoxide and hydrogen escaping can flow through the conduit 7 to the gasometer 9 in which it is collected. The stream of starting mixture is now led into the second adsorption chamber and the first chamber is connected by closing the valve 7' and opening the valve 8', with the pump 11 for the purpose of de-charging. Until a certain reduced pressure (for example 100 mms.) has been obtained a mixture is sucked off, the carbon monoxide content of which is about equal to that of the starting mixture. This first running is led back through the conduit 13 into the starting mixture after the conduit 14 leading to the conversion plant has been closed by the two-way valve 15. Hereupon by turning the valve 15 the conduit 14 is opened to the gas stream and the pressure is continually further reduced until it reaches a value of for example 10 mms. Thereby a gas mixture is driven out which contains about 50% of carbon monoxide. This mixture passes through the conduit 14 into the gas holder 16, from which it is conveyed by the compressor 18 into the conversion plant 20 where the carbon monoxide is removed by water gas oxidation to a residual content of 3%. The purified gas after washing out the carbon dioxide passes out of the pressure vessel 22 through the conduit 21 to the place of use.

What I claim is:

1. A process for removing carbon monoxide from a mixture thereof with hydrogen which comprises passing said mixture into contact with activated carbon at a temperature of the order of minus 50° C. and thereby selectively adsorbing carbon monoxide from the mixture at a high ratio, with respect to hydrogen, and thus producing an effluent gas enriched in hydrogen, collecting said effluent gas, and discontinuing passage of said mixture prior to the time when the carbon monoxide content of the effluent gas increases suddenly.

2. A process for removing carbon monoxide from a mixture thereof with hydrogen which comprises passing said mixture alternately in separate cycles through separate masses of activated carbon at a temperature of the order of minus 50° C. and in each such cycle thereby effecting selective adsorption of carbon monoxide from the mixture at a high ratio, with respect to hydrogen, and thus producing an effluent gas enriched in hydrogen, collecting the effluent gas, and discontinuing passage of the mixture to the mass in use and passing the mixture to the other mass just prior to the time when the carbon monoxide content of the effluent gas increases suddenly.

3. A process according to claim 2 in which the masses of activated carbon are subjected to reduced pressure, after discontinuing passage of said mixture, to thereby remove carbon monoxide enriched adsorbate and condition the mass for re-use.

4. A process according to claim 2 in which the masses of activated carbon are subjected to reduced pressure, after discontinuing passage of said mixture, to thereby remove carbon monoxide enriched adsorbate and condition the mass for re-use, said pressure reduction being applied in stages and the first runnings comprising a fraction high in hydrogen being passed into the starting mixture.

KONRAD ERDMANN.